(12) United States Patent
Choi

(10) Patent No.: US 9,580,036 B2
(45) Date of Patent: Feb. 28, 2017

(54) APPARATUS FOR FIXING CURTAIN AIR BAG CUSHION

(71) Applicants: HYUNDAI MOTOR COMPANY, Seoul (KR); KIA MOTORS CORPORATION, Seoul (KR)

(72) Inventor: Jun Yeol Choi, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/709,334

(22) Filed: May 11, 2015

(65) Prior Publication Data

US 2016/0159308 A1 Jun. 9, 2016

(30) Foreign Application Priority Data

Dec. 8, 2014 (KR) .......................... 10-2014-0175243

(51) Int. Cl.
*B60R 21/213* (2011.01)
*B60R 21/232* (2011.01)
*B60R 21/201* (2011.01)

(52) U.S. Cl.
CPC .......... *B60R 21/213* (2013.01); *B60R 21/201* (2013.01); *B60R 21/232* (2013.01)

(58) Field of Classification Search
CPC .... B60R 21/213; B60R 21/232; B60R 21/201
USPC .......................................... 280/728.2, 730.2
See application file for complete search history.

(56) References Cited

U.S. PATENT DOCUMENTS

| 2015/0102588 A1* | 4/2015 | Cheal | B60R 21/201 |
|---|---|---|---|
| | | | 280/728.2 |
| 2015/0291119 A1* | 10/2015 | Noma | B60R 21/201 |
| | | | 280/728.2 |

FOREIGN PATENT DOCUMENTS

| JP | 2011-105159 A | 6/2011 |
|---|---|---|
| JP | 2011-121473 A | 6/2011 |
| JP | 2012-101595 A | 5/2012 |
| JP | 2014-189180 A | 10/2014 |
| KR | 10-2005-0047362 A | 5/2005 |
| KR | 10-2008-0050849 A | 6/2008 |
| KR | 10-2009-0062853 A | 6/2009 |
| KR | 10-2010-0011504 A | 2/2010 |
| KR | 10-2012-0041355 A | 5/2012 |

OTHER PUBLICATIONS

Korean Office Action dated Mar. 24, 2016 issued in Korean Patent Application No. 10-2014-0175243.
(Continued)

*Primary Examiner* — Keith Frisby
(74) *Attorney, Agent, or Firm* — McDermott Will & Emery LLP

(57) ABSTRACT

An apparatus for fixing a curtain air bag cushion to a pillar of a vehicle includes a cushion bracket configured to be attached to the pillar. The cushion bracket has a fixing portion provided with a bolt hole, a support portion provided with a cover hole, and locking grooves between the fixing portion and the support portion. A cushion tab cover is configured to pass through the cover hole. A cushion band has a cover end coupled to the cushion tab cover and a hole end provided with a band hole. The band hole is configured to receive the first side of the cushion bracket such that the hole end of the cushion band is seated in the locking grooves.

7 Claims, 4 Drawing Sheets

(56) References Cited

OTHER PUBLICATIONS

Korean Notice of Allowance dated Jul. 27, 2016 issued in Korean Patent Application No. 10-2014-0175243.

* cited by examiner

APPARATUS FOR FIXING CURTAIN AIR BAG CUSHION

CROSS REFERENCE TO RELATED APPLICATION

The present application claims priority to Korean Patent Application No. 10-2014-0175243, filed Dec. 8, 2014, the entire contents of which is incorporated herein for all purposes by this reference.

TECHNICAL FIELD

The present inventive concept relates to an apparatus for fixing a curtain air bag cushion, and more particularly, to an apparatus for fixing a curtain air bag cushion which is used to fix a folded curtain air bag cushion to a pillar of a vehicle body.

BACKGROUND

Generally, a vehicle is equipped with various kinds of air bag apparatuses for protecting passengers in case of an accident. Among those, the curtain air bag apparatus is installed to prevent indoor passengers from being catapulted out of a vehicle through a door window glass in case of a rollover and a broadside collision of the vehicle.

The curtain air bag apparatus is configured to include an inflator, an air bag cushion unfolded by a gas pressure which is generated at the time of an explosion of the inflator so as to cover a door window glass, a cushion tether keeping a shape of the unfolded air bag cushion, and the like. As illustrated in FIG. 1, the air bag cushion 1 before the inflator is exploded is installed at a pillar 2 of a vehicle body in a folded state (rolled up and folded state) by a fixing apparatus. The fixing apparatus is configured to include a plurality of cushion bands 3 which are formed in a band shape having a predetermined length and a cushion bracket 4, in which the cushion band 3 encloses the folded air bag cushion 1 and the cushion band 3 enclosing the air bag cushion 1 is coupled with the cushion bracket 4 and the cushion bracket 4 is fixedly coupled with the pillar 2 of the vehicle body by a bolt or a screw.

The cushion band 3 is provided with a tear line. By this configuration, the folded air bag cushion 1 is unfolded while tearing the tear line by the gas pressure at the time of the explosion of the inflator.

However, the existing fixing apparatus configured as described above has a problem in that when the cushion band 3 enclosing the air bag cushion 1 is coupled with the cushion bracket 4, the cushion band 3 is not coupled with the cushion bracket 4 so as to be completely fixed to the cushion bracket 4 and thus the air bag cushion 1 and the cushion band 3 may shake at the time of the behavior of the vehicle and when the shaking as described above is continued for a long period of time, a load is delivered to the cushion bracket 4 and thus a bonding strength between the cushion band 3 and the cushion bracket 4 may be weak and, in severe cases, a quality problem of headlining may occur due to a deflection of the pillar 2.

Further, the existing fixing apparatus has a structure in which the cushion bracket 4 may not support the folded air bag cushion 1. In this case, when the air bag cushion 1 is unfolded, a portion of the cushion is likely to be unfolded toward the exterior of the vehicle and the portion which is unfolded toward the exterior of the vehicle is likely to be damaged and broken due to an interference with a panel of a vehicle body.

The contents described as the related art have been provided only for assisting in the understanding for the background of the present inventive concept and should not be considered as corresponding to the related art known to those skilled in the art.

SUMMARY

An object of the present disclosure is to provide an apparatus for fixing a curtain air bag cushion capable of preventing an air bag cushion and a cushion band from shaking at the time of a behavior of a vehicle by fixedly coupling the cushion band with the cushion bracket so as to prevent the cushion bracket from moving when the cushion band is coupled with the cushion bracket in a state in which it encloses the folded air bag cushion, thereby preventing a bonding strength of the cushion bracket from weakening and preventing a pillar from being deflected to improve a quality problem of headlining.

Another object of the present inventive concept is to enable a cushion bracket to support a folded air bag cushion in an indoor side direction when the cushion bracket is fixedly coupled with a pillar of a vehicle body to prevent a portion of the air bag cushion from being unfolded toward an outdoor side when the air bag cushion is unfolded, thereby preventing the air bag cushion from being damaged due to an interference with a panel of the vehicle body.

According to an exemplary embodiment of the present inventive concept, an apparatus for fixing a curtain air bag cushion to a pillar of a vehicle includes a cushion bracket configured to be fixedly attached to the pillar. The cushion bracket may have first and second opposing sides. A fixing portion, proximate the first opposing side, may be provided with a bolt hole. A support portion, proximate the second opposing side, may be provided with a cover hole. Third and fourth opposing sides, extending between the first and second opposing sides, may each be provided with a locking groove. A cushion tab cover may be configured to pass through the cover hole and enclose the second side of the cushion bracket. A cushion band may be configured to a cover end coupled to the cushion tab cover and a hole end provided with a band hole. The band hole may be configured to receive the first side of the cushion bracket such that the hole end of the cushion band is seated in the locking grooves.

In certain embodiments, when the hole end of the band hole is seated in the locking grooves, the air bag cushion, when folded, may have an outer circumference enclosed by the cushion tab cover and the cushion band and thus may be fixed in a folded state.

In certain embodiments, one side of the fixing portion may be provided with a stopper protrusion protruding toward the the interior of the vehicle. In certain embodiments, the support portion may be bent toward the interior of the vehicle to support the air bag cushion while the air bag is folded. In certain embodiments, the third and fourth opposing sides may be provided with locking protrusions. Each locking protrusion may have a surface inclined outwardly toward the second opposing side, and the locking protrusions may be adjacent the locking grooves.

In certain embodiments, the cushion tab cover may be sewn to the cushion band.

In certain embodiments, the cushion band may be provided with a plurality of tear lines so that when the air bag cushion unfolds at the time of an explosion of an inflator, the cushion band tears, and at least one of the tear lines is connected to the band hole.

In certain embodiments, the band hole may have the form of an inverted triangle, and the hole end of the cushion band may be firmly fixed in the locking grooves by the locking protrusions. In certain embodiments, when the cushion bracket is fixedly attached to the pillar, the support portion of the cushion bracket may be spaced apart from a body panel of the vehicle.

In certain embodiments, the pillar may be a front pillar. In certain embodiments, the cushion bracket may be attached to the pillar with a bolt inserted in the bolt hole.

BRIEF DESCRIPTION OF THE DRAWINGS

The above and other objects, features and advantages of the present inventive concept will be more clearly understood from the following detailed description taken in conjunction with the accompanying drawings, in which:

FIGS. 3 and 4 are views illustrating a state in which the air bag cushion is fixed to a pillar of a vehicle body by the fixing apparatus according to the exemplary embodiment of the present inventive concept, in which FIG. 3 is a view viewed from an indoor side and FIG. 4 is a view viewed from an outdoor side;

DETAILED DESCRIPTION

Figure 1:
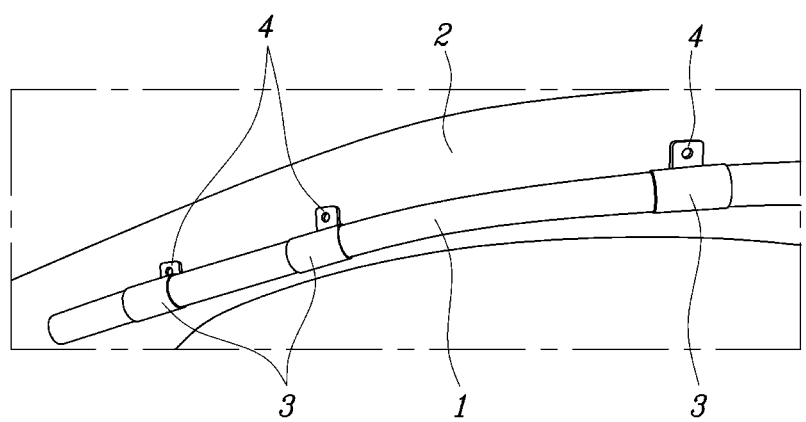
FIG. 1 is a view illustrating a state in which an air bag cushion is fixed to a pillar by the existing fixing apparatus.

Hereinafter, an apparatus for fixing a curtain air bag cushion according to an exemplary embodiment of the present inventive concept will be described with reference to the accompanying drawings.

The apparatus for fixing a curtain air bag cushion according to the exemplary embodiment of the present inventive concept is configured to fixedly install an air bag cushion to a pillar of a vehicle. In certain embodiments, the airbag cushion may be rolled up, folded, or both rolled up and folded. As illustrated in FIGS. 2 to 6, the apparatus includes a cushion bracket 10 configured to be fixedly attached to a pillar 2 of the vehicle. The cushion bracket 10 has an fixing portion 15 located near a first, upper side 10a, a support portion 16 located near a second, lower side 10b, and an intermediate portion 18 located between the fixing portion 15 and the support portion 16. The fixing portion 16 is provided with a bolt hole 11 and the support portion 16 is provided with a cover hole 12. The intermediate portion 18 has two opposing sides (third and fourth opposing sides 10c and 10d) provided with locking grooves 13. The apparatus also includes a cushion tab cover 20 configured to pass through the cover hole 12 to enclose the lower side 10b of the cushion bracket 10; and a cushion band 30 configured to have one end coupled to the cushion tab cover 20 and the other end provided with a band hole 31, in which the end having the band hole 31 is seated in the locking groove 13 when the upper side of the cushion bracket 10 is inserted in the band hole 31.

Figure 2:
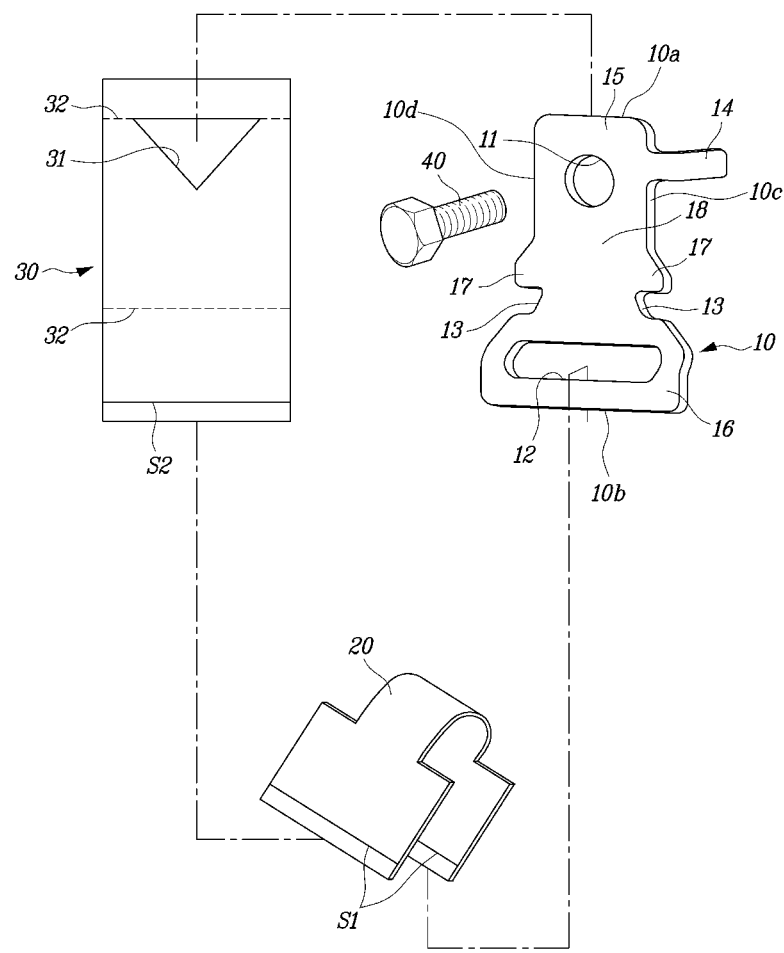
FIG. 2 is an exploded perspective view of an apparatus for fixing a curtain air bag cushion according to an exemplary embodiment of the present inventive concept.
Figure 3:
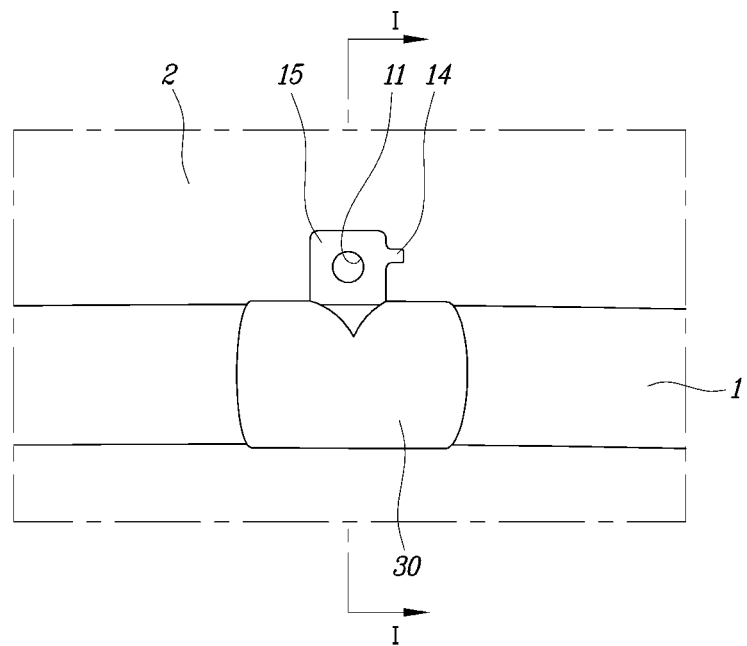
Figure 4:
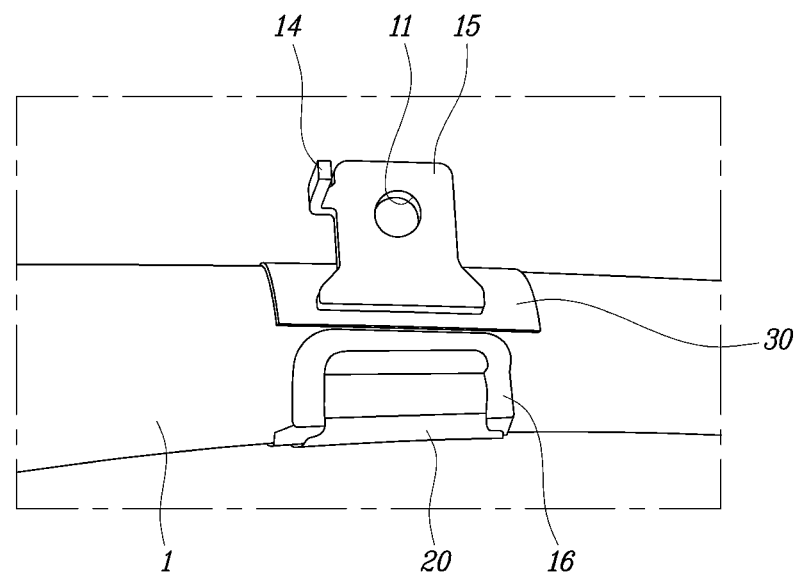
Figure 5:
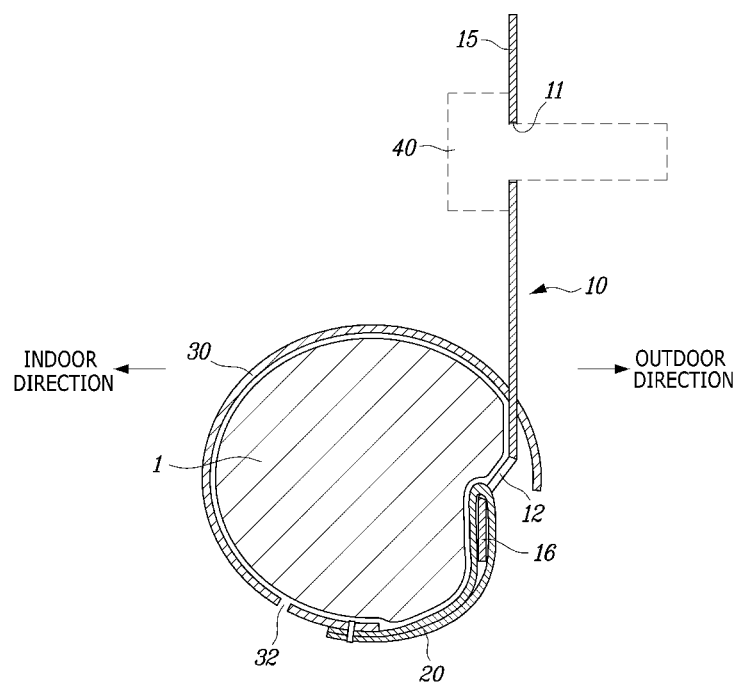
FIG. 5 is a cross-sectional view taken along line I-I of FIG. 3.

The cushion bracket 10 has a structure in which a bolt 40 penetrating through the bolt hole 11 may be fixedly coupled with the pillar 2 of the vehicle body and thus is fixedly attached to the pillar 2. The cushion bracket 10 may be coupled to any pillar in the vehicle, including, but not limited to, front, side, and rear pillars. The embodiment illustrated in FIG. 2 shows bolt 40, but the cushion bracket 10 may be attached by other means not limited to a bolt.

When the band hole 31 is seated in the locking groove 13 when penetrated by the upper side 10a of the cushion bracket 10 and is fixed, the folded air bag cushion 1 has an outer circumference enclosed by the cushion tab cover 20 and the cushion band 30 and thus is fixed in a folded state.

In certain embodiments, one side of the fixing portion 15 is provided with a stopper protrusion 14 protruding toward the pillar 2, and the support portion 16 is bent toward the interior of the vehicle to support the folded air bag cushion 1. In certain embodiments, the sides 10c and 10d of the intermediate portion 18 may be provided with locking protrusions 17 having a surface inclined downwardly (i.e. towards the lower side 10b). The locking grooves 13 are adjacent to the locking grooves 17.

In certain embodiments, when the cushion bracket 10 is fixedly coupled with the pillar 2 by the bolt 40, the stopper protrusion 14 is inserted into a hole (not illustrated) which is formed at the pillar 2 and therefore the stopper protrusion 14 serves as a guide when the cushion bracket 10 is coupled with the pillar 2 and serves to prevent the cushion bracket 10 from moving when the cushion bracket 10 is coupled with the pillar 2, thereby strengthening the bonding strength of the cushion bracket 10.

In certain embodiments, when the support portion 16 supports the folded air bag cushion 1 in an indoor side direction, an unfolding direction of the air bag cushion 1 may be induced in the indoor side direction to prevent the interference between a panel 50 of the vehicle body at the indoor side and the cushion, thereby preventing the cushion from being damaged and broken due to the interference with the panel 50 of the vehicle body.

In certain embodiments, an outer surface of the locking protrusion 17 is formed as a surface inclined downwardly so that the band hole 31 may be easily inserted into the locking groove 13 at the time of inserting the band hole 31 into the locking groove 13, and a surface connected to the inclined surface of the locking protrusion 17 at the locking groove 13 is formed as a horizontal surface, and thus the cushion band 30 inserted into the locking groove 13 has a structure to be prevented from separating from the locking groove 13.

In certain embodiments, the cushion tab cover 20 is sewn to the cushion band 30. Reference numerals S1 and S2 illustrated in FIG. 2 represent a sewing line of the cushion tab cover 20 and the cushion band 30, respectively.

In certain embodiments, the cushion band 30 is provided with a plurality of tear lines 32 so that the folded air bag cushion 1 is unfolded while tearing the cushion band 30 at the time of an explosion of an inflator, in which at least one of the tear lines 32 is formed to be connected to the band hole and thus may be more easily torn at the time of the unfolding of the air bag cushion 1.

In certain embodiments, the band hole 31 may be formed as an inverted triangle so that the cushion band 30 does not come out by being locked to the locking protrusion 17 when being inserted into the locking groove 13, but is not limited thereto.

Figure 6:
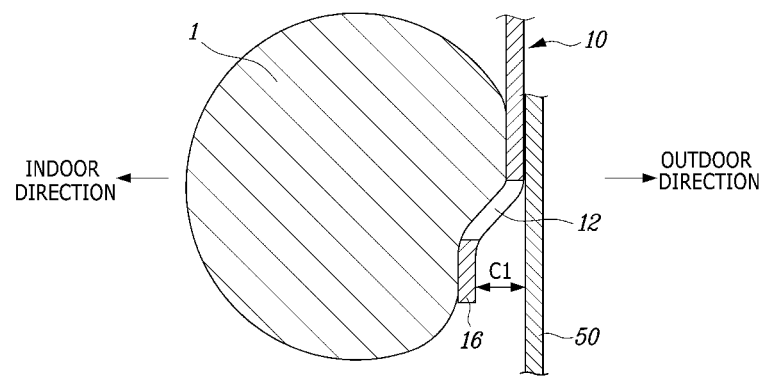
FIG. 6 is a view for describing an installation state of a cushion bracket according to the exemplary embodiment of the present inventive concept and a panel of a vehicle body.

Further, in certain embodiments, when the cushion bracket 10 is fixedly installed to the pillar 2 of the vehicle body, as illustrated in FIG. 6, the lower support portion 16 may be installed in the state in which it is spaced apart from the panel 50 of the vehicle body at a predetermined distance C1, and thus when the air bag cushion 1 is unfolded while the unfolding direction of the air bag cushion 1 is induced to the indoor side, it is possible to prevent the interference between the panel 50 of the vehicle body at the outdoor side and the cushion, thereby preventing the cushion from being damaged and broken due to the interference with the panel 50 of the vehicle body.

As described above, in certain embodiments, the apparatus for fixing a curtain air bag cushion according to the exemplary embodiment of the present inventive concept has a structure in which when the cushion tab cover 20 and the cushion band 30 are fixed to the cushion bracket 10 while enclosing the folded air bag cushion 1, the band hole 31 formed at the cushion band 30 is fixed by being locked to the locking protrusion 17 while being inserted into the locking groove 13 formed at the cushion bracket 10, thereby preventing the folded air bag cushion 1 and the cushion band 30 from shaking at the time of the behavior of the vehicle. Further, the shaking of the folded air bag cushion 1 and the cushion band 30 is removed and thus the bonding strength of the cushion bracket 10 coupled with the pillar 2 may be strengthened, thereby preventing the pillar 2 from being deflected to improve the quality problem of the headlining.

Further, according to an exemplary embodiment of the present inventive concept, the support portion 16 of the cushion bracket 10 is installed in the state in which it is spaced apart from the panel 50 of the vehicle body positioned at the outdoor side at the predetermined distance C1 while supporting the folded air bag cushion 1 in the indoor side direction so as to induce the unfolding direction of the air bag cushion 1 in the indoor side direction, thereby preventing the interference between the unfolded air bag cushion 1 and the panel 50 of the vehicle body to prevent the cushion from being damaged and broken due to the panel 50 of the vehicle body.

Further, according to an exemplary embodiment of the present inventive concept, the tear line 32 formed at the cushion band 30 is formed to be connected to the band hole 31 and thus the tear line 32 may be more easily torn at the time of the unfolding of the air bag cushion 1, thereby more improving the unfolding performance of the air bag cushion 1.

According to exemplary embodiments of the present inventive concept, when the cushion tab cover and the cushion band are fixed to the cushion bracket while enclosing the folded air bag cushion, the band hole which is formed at the cushion band is fixed by being locked to the locking protrusion while being inserted into the locking groove which is formed at the cushion bracket to prevent the folded air bag cushion and the cushion band from shaking at the time of the behavior of the vehicle, thereby strengthening the bonding strength of the cushion bracket coupled with the pillar and preventing the pillar from being deflected to improve the quality problem of the headlining.

Although the present inventive concept has been shown and described with respect to specific exemplary embodiments, it will be clear to those skilled in the art that the present inventive concept may be variously modified and altered without departing from the spirit and scope of the present inventive concept as defined by the following claims.

What is claimed is:

1. An apparatus for fixing a curtain air bag cushion to a pillar of a vehicle, the vehicle having an exterior and an interior, the apparatus comprising:

a cushion bracket configured to be fixedly attached to the pillar, the cushion bracket having first and second opposing sides, a fixing portion proximate the first opposing side provided with a bolt hole, a support portion proximate the second opposing side provided with a cover hole, and third and fourth opposing sides extending between the first and second opposing sides, wherein each of the third and fourth opposing sides is provided with a locking groove;

a cushion tab cover configured to pass through the cover hole and enclose the second side of the cushion bracket; and a cushion band having a cover end coupled to the cushion tab cover and a hole end provided with a band hole, wherein the band hole is configured to receive the first side of the cushion bracket such that the hole end of the cushion band is seated in the locking grooves, wherein when the hole end of the band hole is seated in the locking grooves, the air bag cushion, when folded, has an outer circumference enclosed by the cushion tab cover and the cushion band and thus is fixed in a folded state, wherein the cushion band is provided with a plurality of tear lines so that when the air bag cushion unfolds at the time of an explosion of an inflator, the cushion band tears, and at least one of the tear lines is connected to the band hole, wherein one side of the fixing portion is provided with a stopper protrusion protruding toward the exterior of the vehicle, wherein the support portion is bent toward the interior of the vehicle to support the air bag cushion while the air bag is folded, wherein a bent part of the support portion is directly adjacent to the air bag cushion while the air bag is folded, and the third and fourth opposing sides are provided with locking protrusions, each locking protrusion having a surface inclined outwardly toward the second opposing side, and the locking protrusions are adjacent the locking grooves.

2. The apparatus of claim 1, wherein the cushion tab cover is sewn to the cushion band.

3. The apparatus of claim 1, wherein the band hole has the form of an inverted triangle, and the hole end of the cushion band is firmly fixed in the locking grooves by the locking protrusions.

4. The apparatus of claim 1, wherein when the cushion bracket is fixedly attached to the pillar, the support portion of the cushion bracket is spaced apart from a body panel of the vehicle.

5. The apparatus of claim 1, wherein the pillar is a front pillar.

6. The apparatus of claim 1, wherein the cushion bracket is attached to the pillar with a bolt inserted in the bolt hole.

7. An apparatus for fixing a curtain air bag cushion to a pillar of a vehicle, the vehicle having an exterior and an interior, the apparatus comprising:

a cushion bracket configured to be fixedly attached to the pillar, the cushion bracket having first and second opposing sides, a fixing portion proximate the first opposing side provided with a bolt hole, a support portion proximate the second opposing side provided with a cover hole, and third and fourth opposing sides extending between the first and second opposing sides, wherein each of the third and fourth opposing sides is provided with a locking groove;

a cushion tab cover configured to pass through the cover hole and enclose the second side of the cushion bracket; and a cushion band having a cover end coupled to the cushion tab cover and a hole end provided with a band hole, wherein the band hole is configured to receive the first side of the cushion bracket such that the hole end of the cushion band is seated in the locking grooves, wherein when the hole end of the band hole is seated in the locking grooves, the air bag cushion, when folded, has an outer circumference enclosed by the cushion tab cover and the cushion band and thus is fixed in a folded state, and wherein the cushion band is provided with a plurality of tear lines so that when the air bag cushion unfolds at the time of an explosion of an inflator, the cushion band tears, and at least one of the tear lines directly contacts the band hole.

\* \* \* \* \*